United States Patent [19]

Justice et al.

[11] Patent Number: 4,830,837

[45] Date of Patent: May 16, 1989

[54] PROCESS FOR REMOVING ALUMINUM FROM CONCENTRATED ALKALI METAL HALIDE BRINES

[75] Inventors: David D. Justice, Cleveland; David A. Helmstetter, both of Cleveland; Emily J. Reed, Englewood; Tsujihiko Fukunaga, Cleveland, all of Tenn.

[73] Assignee: Olin Corporation, Cheshire, Conn.

[21] Appl. No.: 80,834

[22] Filed: Aug. 3, 1987

[51] Int. Cl.$^4$ .......................... C25B 1/16; C25B 1/26
[52] U.S. Cl. ...................................... 423/181; 204/98; 204/128; 210/673; 210/681
[58] Field of Search ................ 423/181; 210/673, 681; 204/98, 128

[56] References Cited

U.S. PATENT DOCUMENTS

| | | | |
|---|---|---|---|
| 2,911,378 | 11/1959 | Bregman | 210/681 |
| 4,207,152 | 6/1980 | Kadija et al. | 204/98 |
| 4,450,057 | 5/1984 | Kelly | 423/499 |
| 4,515,665 | 5/1985 | Fair et al. | 204/98 |
| 4,568,466 | 2/1986 | Salem et al. | 210/681 |
| 4,578,195 | 3/1986 | Moore et al. | 210/679 |
| 4,618,403 | 10/1986 | Fair et al. | 204/98 |

FOREIGN PATENT DOCUMENTS

| | | | |
|---|---|---|---|
| 2845943 | 4/1980 | Fed. Rep. of Germany. | |
| 8610076 | 7/1976 | Japan. | |
| 113614 | 9/1980 | Japan | 423/181 |
| 149823 | 9/1982 | Japan | 423/181 |

OTHER PUBLICATIONS

"Ion-Exchange Purification of Feed Brine for Chlor-Alkali Electrolysis Cells The Role of DUOLITE® ES-467", J. J. Wolff and R. E. Anderson, from the *American Institute of Chemical Engineers*, No. 219, vol. 78, 1982, pp. 46–53.

*Primary Examiner*—John Doll
*Assistant Examiner*—Wayne A. Langel
*Attorney, Agent, or Firm*—James B. Haglind

[57] ABSTRACT

A process for purifying an alkali metal halide brine containing aluminum as an impurity which comprises adjusting the pH of the alkali metal halide brine to the range of from about 8.5 to about 9.5 and contacting the alkali metal halide brine with an ion exchange resin having a phosphonic acid group.

Using the novel process of the present invention, high purity alkali metal halide brines may be produced for use in electrolytic membrane cells which have concentrations of aluminum reduced to a level which will not cause damage to a cation exchange membrane or affect the membranes ability to transport cations or water molecules.

18 Claims, No Drawings

PROCESS FOR REMOVING ALUMINUM FROM CONCENTRATED ALKALI METAL HALIDE BRINES

This invention relates to a process for purifying alkali metal halide brines. More particularly, this invention relates to the removal of aluminum from concentrated alkali metal brine solutions.

Alkali metal halide brines for use in membrane electrolytic cells are concentrated solutions which are prepared by dissolving the alkali metal halide in water or a less concentrated aqueous brine solution. The impurities in the brine produced vary in both types and concentration with the source of salt. Typically, the brine, which is a neutral solution, contains as impurities significant concentrations of calcium, magnesium, iron, and silica as well as lower concentrations of complex-forming elements such as aluminum, zinc, tin, and lead.

To remove impurities such as calcium, magnesium and iron, the brines have traditionally been treated with basic salts such as alkali metal carbonates and alkali metal hydroxides to produce, as insoluble precipitates, the carbonates and hydroxides of these elements. These precipitates are removed from well known settling or filtering methods. Occasionally, flocculants, such as aluminum or ferric chloride, are added to reduce the settling time required to remove these precipitates. During these treatment and separation steps, the concentration of silica is also reduced along with that of any other elements in ionic form which react with the brine treatment agents to produce insoluble compounds.

As the cation exchange membranes employed in electrolytic membrane cells are easily damaged by even moderate concentrations of elements such as calcium and magnesium, the brine is further purified by methods including, for example, ion exchange processes.

The ion exchange resins typically employed in brine purification processes include those having alkylene tetraacetic acid or iminodiacetic acid as funcional groups. While these resins suitably reduce calcium and magnesium concentrations to below about b 50 parts per billion (ppb) and 10 ppb respectively, they do not significantly reduce the concentration of amphoteric elements such as aluminum.

Brine fed to the anode compartments of membrane cells is electrolyzed to produce a halogen gas and an alkali metal hydroxide while reducing the alkali metal halide concentration. A spent brine is formed which is removed from the anode compartments, treated to remove available halogen compounds, and resaturated for re-use in the electrolytic process.

Employing the known brine treatment processes, the aluminum concentration builds up to a level which is sufficient to significantly impair the membranes' ability to transport cations and water molecules and even physically damage the membrane. Further, when aluminum is present together with silica, a stable colloidal complex forms in brines having a pH of above about 3 which is quite difficult to remove.

One process for reducing the aluminum concentration of alkali metal brines is described in U.S. Pat. No. 4,450,057, issued May 22, 1984 to P. P. Kelly. In this process, the concentrated alkali metal halide brine is acidified to a pH of between 2.0 and 3.0, to convert aluminum present to the soluble $Al^{+3}$ form. The acidic brine is then contacted with a strong macroreticular cationic chelating resin to remove the dissolved aluminum ions as negative sites $(ON^-)$ on the resin. Suitable ion exchange resins include those having the structure:

where R is the resin matrix or backbone.

In this process hydrogen ions $(H^+)$ from the acid compete with the aluminum ions for $OH^-$ sites on the resin. Neutralization of the $OH^-$ sites with $H^+$ ions makes the resin less effective for Al ion removal and requires frequent regeneration of the resin at a significant cost in time and money.

Processes which stabilize aluminum as solid particles of an Al-silica complex are described in U.S. Pat. Nos. 4,515,665 and 4,618,403 issued to D. L. Fair et al. The brine is maintained at a pH in the range of 4-12 to prevent aluminum from dissolving. The solid particles of the Al complex are removed from the spent brine, for example, by filtration processes.

While these processes minimize damage to membranes by the deposition of aluminum within the membrane, a gradual increase in the concentration of aluminum occurs which eventually requires a treatment for removal.

Therefore, there still is a need for a process of brine purification which reduces the concentration of aluminum in concentrated alkali metal halide brines. Further, there is a need for a process which simultaneously removes alkaline earth metals and aluminum in the purification of alkali metal halide brines.

According to the present invention, a novel process is provided for purifying an alkali metal halide brine containing aluminum as an impurity which comprises adjusting the pH of the alkali metal halide brine in the range of from about 8.5 to about 9.5 and contacting the alkali metal halide brine with an ion exchange resin having a phosphonic acid group.

Concentrated alkali metal halide brines treated by the novel process of the present invention include aqueous solutions of halides of the elements of Group I of the periodic table, and particularly sodium, potassium, and lithium. For commercial reasons, sodium and potassium are preferred alkali metals. The term halide is intended to include chloride and bromide brines, with chloride brines being preferred embodiments. Suitable for aluminum removal are, for example, sodium chloride brines containing from about 150 to about 320, and preferably from about 290 to about 310 grams per liter of NaCl. The sodium chloride brines have an initial aluminum concentration which is above about 60 parts per billion, and typically contain from about 100 to about 2500 parts per billion of aluminum. The aluminum present as an impurity for these brines is believed to be dissolved or of a particle size which is not removed by conventional filtration processes. These concentrated sodium chloride brines may be treated by the process of the present invention at any convenient stage of the brine treatment process. Preferably, the sodium chloride brines are treated for aluminum removal after resaturation with NaCl and the normal treatment of the concentrated brines with sodium carbonate and sodium hydroxide to substantially reduce the concentration of alkaline earth metals such as calcium and magnesium as well as heavy metals such as iron.

At this stage of the purification process, the pH of the brine is above 10, for example, in the range of 10.5 to 11.5. The pH of the brine is reduced to the required range of from about 8.5 to about 9.5, preferably from about 8.5 to about 9.3, and more preferably from about 8.8 to about 9.2, for example, by the addition of an inorganic mineral acid such as hydrochloric acid.

The pH adjusted brine containing aluminum as an impurity is contacted with an aluminum removal agent having a minimal or substantially zero surface charge within the required pH range. Aluminum removal agents having a point of zero charge (isoelectric point) or minimal surface charges include cation exchange resins having phosphonic acid functional groups and silica compounds such as silica gel or sand.

In accordance with the process of the present invention, the pH of the brine contacted with an aluminum removal agent is an important feature. The discovery that efficient aluminum removal is achieved by maintaining the pH within a narrow range while in contact with selected aluminum removal agents is indeed surprising. Further, at brine pH's above about 9.5, the aluminum is stripped off the aluminum removal agent and the desired aluminum concentrations in the purified brine cannot be consistently achieved.

Suitable as an aluminum removal agent are ion exchange resins having a phosphonic acid group, where the term phosphonic acid includes phosphonate groups containing alkali metal ions. Examples of these resins include those having alkyl and substituted alkyl phosphonic acid groups, alkyl and substituted alkyl diphosphonic acid groups, amino phosphonic acid groups, amino disphosphonic acid groups, alkyl amino phosphonic acid groups, alkyl amino diphosphonic acid groups, amino alkyl phosphinic acid groups, amino alkyl diphosphonic acid groups, etc.

Preferred as aluminum removal agents are ion exchange resins which contain amino phosphonic acid groups as represented by the following structure:

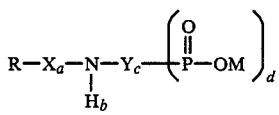

where
R represents the resin matrix or backbone
X represents a lower alkyl group,
Y represents a lower alkyl group,
M represents H or an alkali metal,
a represents 0 or 1,
b represents 0 or 1,
c represents 0 or 1, and
d represents 1 or 2.

The ion exchange resin matrix or backbone represented by R may include, for example, copolymers of styrene with divinylbenzene, copolymers of a methacrylate or acrylate with divinylbenzene, phenol-formalin resins, etc. The lower alkyl groups designated by X and Y are alkyl groups having from 1 to about 4 carbon atoms. When M represents an alkali metal, it is sodium or potassium.

More preferred embodiments include amino phosphonic acid containing ion exchange resins in which R represents copolymers of styrene and divinylbenzene; X and Y represent individually methyl or ethyl groups; a, b, c, and d each represent 1; and M represents the sodium ion. Commercially available ion exchange resins of this type include Duolite ES-467 (Diamond Shamrock Corp.).

The pH adjusted brine is contacted with the ion exchange resin having amino phosphonic acid groups using known procedures to simultaneously remove undesirable cation impurities such as alkaline earth metals and iron as well as aluminum to provide a purified alkali metal halide brine having reduced levels of these impurities. The purified brine contains less than 50 parts per billion of Al and preferably less than about 30 parts per billion. Typically, the purified alkali metal halide brines contain aluminum in from negligible amounts, for example, about 2 parts per billion to about 20 parts per billion. The brine is now suitable for electrolysis in electrolytic cells employing cation exchange membranes without substantially damaging the membranes or reducing their operating efficiencies.

The aluminum may be removed from the ion exchange resin by washing the resin with, for example, water. Alkaline earth metal and iron may be removed from the ion exchange resin using known regeneration methods.

In an alternate embodiment, the concentrated sodium chloride brine may be first contacted with an ion exchange resin containing, for example, amino acetate or imino diacetate functional groups to remove alkaline earth metal ions and heavy metals such as iron; and then at the required brine pH, contacted with an ion exchange resin containing amino phosphonic acid groups to remove aluminum.

The novel process of the present invention is particularly suitable for the electrolysis of alkali metal halide brines such as sodium chloride at high current densities where the presence of aluminum and other cation impurities is more detrimental to the efficient operation of the membrane cell.

Using the novel process of the present invention, high purity alkali metal halide brines may be produced for use in electrolytic membrane cells which have concentrations of aluminum reduced to a level which will not cause damage to a cation exchange membrane or affect the membranes ability to transport cations or water molecules. Further, there is no need to acidify the brines to be treated to convert the aluminum present to the cation form ($Al^{+3}$) prior to contact with the aminophosphonic acid group containing resin; nor is it necessary to maintain the aluminum in complex form during the electrolysis process.

To further illustrate the novel process of the present invention, the following examples are presented.

EXAMPLE 1

A concentrated sodium chloride brine containing 300 grams per liter of NaCl at a temperature of 60° C. and with a pH of 11.0 was acidified with hydrochloric acid to reduce the pH to 9.0. A sample of the pH adjusted brine was analyzed and found to contain an aluminum concentration of 130 parts per billion (ppb). A portion of the pH adjusted brine was passed through a column of a cation exchange resin having alkyl amino phosphonic acid groups in the sodium form. The brine passed through the column at a rate of 6.0 bed volumes/Hr. After 10 bed volumes had passed through the column, the purified brine exiting from the column was analyzed and the Al concentration was found to be 6 ppb.

Comparative Example A

A portion of the pH adjusted brine of Example 1 containing 130 parts per billion of Al at a pH of 9.0 was passed through a precoated (0.45 micron) filter. The filtrate was analyzed and found to have an Al concentration of 90 parts per billion.

Comparative Example B

Using the method of EXAMPLE 1, concentrated NaCl brine (300 gpl NaCl at 60° C.) containing 190 ppb Al with a pH of 11.0 was adjusted to a pH of 10.0 with HCl. The concentrated brine was passed through the ion exchange column of EXAMPLE 1 at 6.0 bed volumes/Hr (BV). After 10 BV had passed through the column, the Al concentrations were found to be 140 ppb.

EXAMPLE 2

A stream of concentrated sodium chloride brine containing 295–305 grams per liter of NaCl at a temperature of 55–60 degrees Celsius and with a pH of 10.5–11.0 was acidified with hydrochloric acid to reduce the pH to 8.5–9.5. This brine stream containing an aluminum concentration of 5–250 parts per billion (ppb) was fed through two columns in series containing the cation exchange resin having alkyl amino phosphonic acid groups in the sodium form. The brine passed through the columns at a rate of 31.5 bed volumes per hour. The brine exiting the second column was analyzed at less than 50 ppm aluminum. This configuration was operated for 273 days and Al maintained at less than 50 ppb aluminum concentrations by simple water rinses or scheduled regenerations. The brine from this process was used in a membrane cell for the production of chlorine and caustic. No performance losses were seen with this membrane during this time.

What is claimed is:

1. A process for purifying an alkali metal halide brine containing aluminum as an impurity which comprises adjusting the pH of the alkali metal halide brine to the range of from about 8.5 to about 9.5 and contacting the pH adjusted alkali metal halide brine with an ion exchange resin having a phosphonic acid group.

2. The process of claim 1 in which the alkali metal is sodium or potassium.

3. The process of claim 2 in which the halide is chloride or bromide.

4. The process of claim 1 in which the ion exchange resin has an amino phosphonic acid group.

5. The process of claim 4 in which the ion exchange resin is represented by the structure:

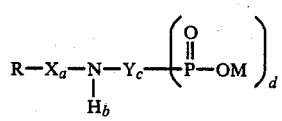

where
R represents the resin matrix or backbone
X represents a lower alkyl group,
Y represents a lower alkyl group,
M represents H or an alkali metal,
a represents 0 or 1,
b represents 0 or 1,
c represents 0 or 1, and
d represents 1 or 2.

6. The process of claim 5 in which X and Y are individually selected lower alkyl groups having from 1 to about 4 carbon atoms.

7. The process of claim 5 in which M is an alkali metal selected from the group consisting of Na or K.

8. The process of claim 5 in which a, b, and c each represent 1.

9. The process of claim 8 in which X represents methyl or ethyl.

10. The process of claim 9 in which Y represents methyl or ethyl.

11. The process of claim 10 in which M is Na.

12. The process of claim 11 in which d represents 1.

13. The process of claim 12 in which the alkali metal halide brine is sodium chloride having an initial Al concentration of at least 60 parts per billion.

14. The process of claim 7 in which the pH of the alkali metal halide brine is in the range of from about 8.5 to about 9.3.

15. The process of claim 5 in which a concentrated sodium chloride brine is at a pH in the range of from about 8.5 to about 9.3 and, after aluminum removal by contact with the ion exchange resin, has an Al concentration of less than about 50 parts per billion.

16. The process of claim 1 in which the aluminum is removed from the ion exchange resin by washing with an aqueous solution.

17. A process for purifying sodium chloride brine having an initial concentration of aluminum as an impurity of at least about 100 parts per billion which comprises adjusting the pH of the sodium chloride brine in the range of from about 8.5 to about 9.3, and contacting the pH adjusted sodium chloride with an ion exchange resin represented by the structure:

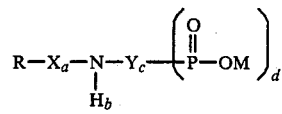

where
R represents the resin matrix or backbone,
X represents a lower alkyl group,
Y represents a lower alkyl group,
M represents H or an alkali metal,
a represents 0 or 1,
b represents 0 or 1,
c represents 0 or 1, and
d represents 1 or 2
to remove the aluminum to a concentration below about 50 parts per billion.

18. A process for purifying an alkali metal halide brine containing aluminum as an impurity which comprises contacting the alkali metal halide brine at a pH in the range of from about 8.5 to about 9.3, with an aluminum removal agent having its isoelectric point within the pH range.

* * * * *